(12) United States Patent
Wang et al.

(10) Patent No.: US 10,904,161 B2
(45) Date of Patent: Jan. 26, 2021

(54) USING ATTRIBUTE VECTOR FOR DYNAMIC CONTENT-BASED ATTRIBUTE QOS FOR NETWORKING AND INTERCONNECT FABRICS

(71) Applicant: Intel Corporation, Santa Clara, CA (US)

(72) Inventors: Ren Wang, Portland, OR (US); Ahmad A. Samih, Austin, TX (US); Christian Maciocco, Portland, OR (US); Andrew Brown, Hillsboro, OR (US); Tsung-Yuan C. Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 38 days.

(21) Appl. No.: 16/218,262

(22) Filed: Dec. 12, 2018

(65) Prior Publication Data

US 2019/0116129 A1 Apr. 18, 2019

(51) Int. Cl.
| | |
|---|---|
| *H04L 12/801* | (2013.01) |
| *H04L 12/24* | (2006.01) |
| *H04L 5/14* | (2006.01) |
| *H04W 84/18* | (2009.01) |
| *H04L 12/927* | (2013.01) |
| *H04L 12/725* | (2013.01) |
| *H04L 12/931* | (2013.01) |
| *H04L 12/863* | (2013.01) |
| *H04L 12/851* | (2013.01) |
| *H04L 12/841* | (2013.01) |

(52) U.S. Cl.
CPC ........ *H04L 47/805* (2013.01); *H04L 41/5022* (2013.01); *H04L 45/302* (2013.01); *H04L 47/2441* (2013.01); *H04L 47/283* (2013.01); *H04L 47/6225* (2013.01); *H04L 49/205* (2013.01)

(58) Field of Classification Search
CPC ... H04L 47/805; H04L 45/302; H04L 49/205; H04L 47/2441; H04L 41/5022; H04L 47/6215; H04L 47/622
See application file for complete search history.

(56) References Cited

U.S. PATENT DOCUMENTS

| | | |
|---|---|---|
| 8,539,074 B2 | 9/2013 | Bartfai-Walcott et al. |
| 9,313,107 B2 | 4/2016 | Bartfai-Walcott et al. |
| 9,516,138 B2 | 12/2016 | Byun et al. |

(Continued)

OTHER PUBLICATIONS

Extended European Search Report dated Apr. 23, 2020 for European Patent Application No. 19208466.3, 11 pages.

*Primary Examiner* — Faruk Hamza
*Assistant Examiner* — Abusayeed M Haque
(74) *Attorney, Agent, or Firm* — Schwabe, Williamson & Wyatt, P.C.

(57) ABSTRACT

Embodiments of the present disclosure describe methods, apparatuses, storage media, and systems for routing data packets in a quality of service (QoS) enabled content-based network or interconnect fabric. Various embodiments describe how to manage data flow based on content-based attribute vectors (AVs) indicating QoS requirements with respect to the data packets in networking or platform interconnects. A dynamic scheduling based on AV information may improve trafficking efficiency and optimize system performance.

26 Claims, 6 Drawing Sheets

(56) References Cited

U.S. PATENT DOCUMENTS

| | | | |
|---|---|---|---|
| 2007/0168827 A1* | 7/2007 | Lohr | H04L 1/1845 |
| | | | 714/749 |
| 2007/0296854 A1* | 12/2007 | Berkey | H04N 21/23406 |
| | | | 348/412.1 |
| 2012/0134449 A1* | 5/2012 | Chen | H04L 1/0052 |
| | | | 375/340 |
| 2012/0327775 A1* | 12/2012 | Han | H04L 47/15 |
| | | | 370/236 |
| 2014/0237278 A1* | 8/2014 | Kumar | G06F 1/3206 |
| | | | 713/323 |
| 2015/0281083 A1 | 10/2015 | Kim et al. | |
| 2016/0095040 A1* | 3/2016 | Valliappan | H04W 16/14 |
| | | | 370/332 |
| 2018/0183724 A1* | 6/2018 | Callard | H04L 41/08 |
| 2018/0278399 A1* | 9/2018 | Sundararajan | H04L 1/0003 |
| 2019/0053270 A1* | 2/2019 | Akoum | H04W 72/046 |
| 2019/0207796 A1* | 7/2019 | Hwang | H04W 72/12 |
| 2019/0313366 A1* | 10/2019 | Shim | H04J 11/00 |

\* cited by examiner

USING ATTRIBUTE VECTOR FOR DYNAMIC CONTENT-BASED ATTRIBUTE QOS FOR NETWORKING AND INTERCONNECT FABRICS

FIELD

Embodiments of the present invention relate generally to the technical fields of computing and networking, in particular, providing techniques related to dynamically routing data flows according to content-based attributes in quality of service (QoS) enabled networking and interconnect fabrics.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

With rapid growth and development in information centric networking (ICN) and intelligent devices, QoS-enabled packet transmission is performed today in switches, network interface controllers (NICs) and routers, input/output (I/O) devices for networking and interconnect fabrics. Content-based attributes become more and more important with respect to QoS consideration.

However, QoS framework in current networking and platform fabric/interconnects is facing issues as network QoS nowadays may need to support thousands or millions of concurrent packet flows but dynamic content-based QoS may not be available. For example, networking QoS schemes usually focus on rendering users or packet flows with high priority and quality of service based on traffic classes, rather than based on a combination of several attributes, such as transmission bandwidth, latency, reliability, and jitter. Thus, allocating more-than-needed resources to one user or a set of packets based on its request of plain traffic class may lead to deficient network resourcing for other users or sets of packets. Further, modern interconnect fabrics, even with various types of virtual channels (VCs) to accommodate different traffic classes or types, usually have resources for each VC in a pre-determined static fashion. In addition, agents are connected to a set of those pre-configured VCs in a static fashion as well. All these may well lead to inefficiencies in data flows in networking or platform interconnects.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Existing network-level QoS schemes may not utilize network resources efficiently when considering a QoS request. There are four traffic classes regarding QoS schemes in general internet traffic and fifth generation (5G) telecommunications. Each traffic class is associated with a different priority of service. For example, Class 4, which is defined as "QoS guaranteed," has a superior priority than Class 1, which is defined as "best effort." Such coarse grain QoS guarantees may unfavorably assign higher priority and/or allocate more-than-needed resources to a particular traffic flow so that other traffic flows in the network may be adversely affected. For instance, a QoS level 1 may optimize both bandwidth and latency. A traffic flow with bandwidth sensitivity and relaxed latency requirements may have to register itself with QoS level 1. In accordance, the traffic flow receives QoS guarantees for both bandwidth and latency, which may potentially waste network resources and adversely affect other traffic flows, since latency may not be a priority to this particular traffic flow. Therefore, some or all of attributes of a particular traffic flow (bandwidth, latency, reliability, jitter, etc.) need to be considered as a whole. An attribute vector (AV) including multiple QoS-related attributes may be designed to describe data packets in a traffic flow with respect to QoS requirements.

In addition, modern interconnect fabrics provide various types of VCs to serve different traffic types. A VC is used to associate one or more logic channels in a buffer-management flow control, and a VC may be associated with a physical I/O port of a router. Various types VCs, for example, low latency VCs, best effort VCs, and deadline-based VCs, may serve various traffic priorities. However, resources for those VCs are pre-configured in a static fashion and agents are connected to a set of pre-configured VCs in a static fashion as well. This may cause inefficient utilization of the system as well. For example, a VC that is configured with low bandwidth may not be able to use additional bandwidth even if all other VCs are idle. Therefore, dynamic scheduling may improve efficiency in the system.

Embodiments described herein may include, for example, apparatuses, systems, methods, and storage media for implementations and configurations of, or related to, dynamic content-based QoS using AVs for traffic routing in a network or interconnect fabric.

Figure 1:
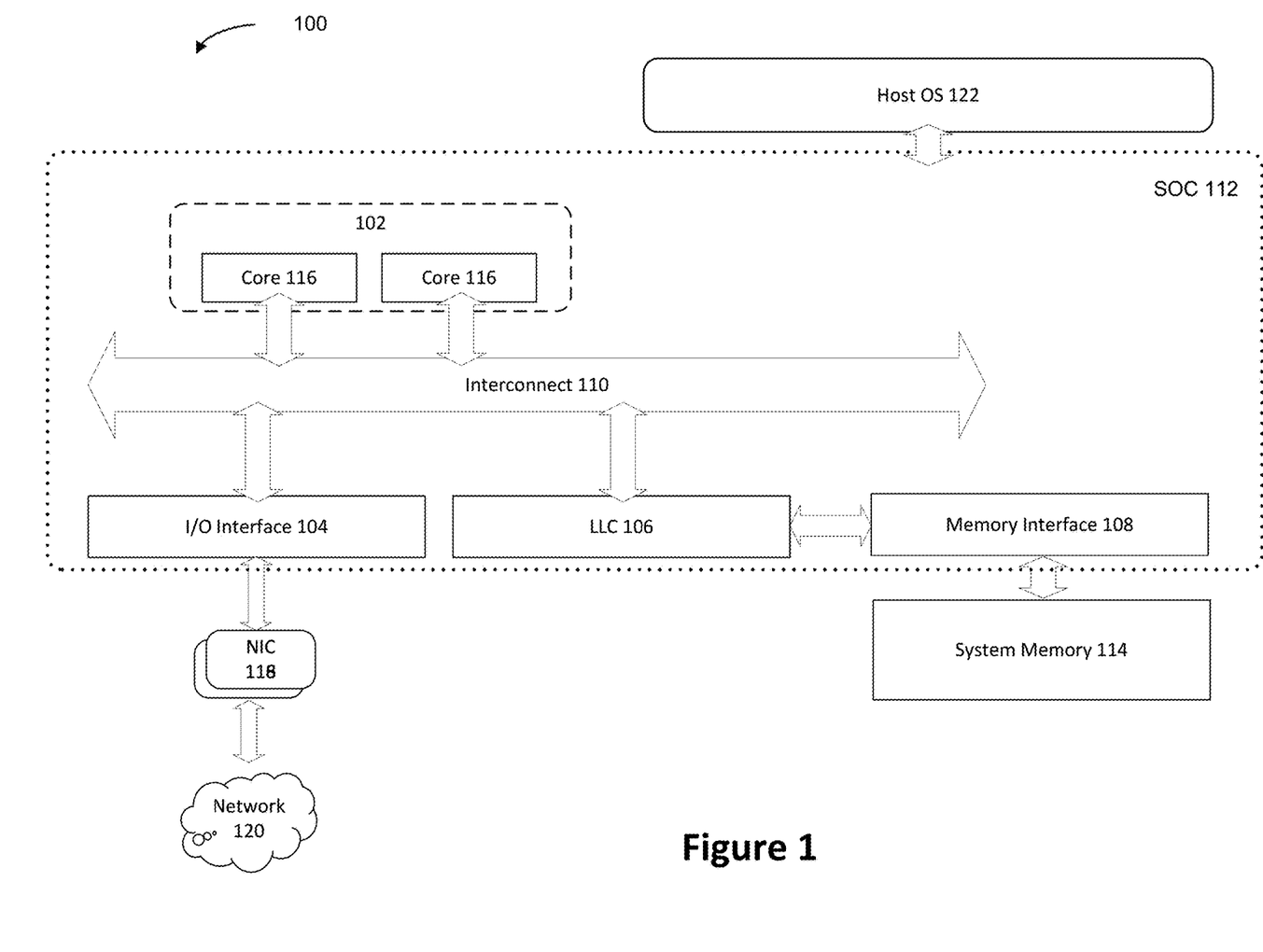
FIG. 1 schematically illustrates an example platform for routing in a computer system in accordance with various embodiments.

FIG. 1 schematically illustrates an example platform for routing in a computer system 100 (hereinafter "platform 100") in accordance with various embodiments herein. For the illustrated embodiments, the platform 100 includes a central processing unit (CPU) 102 coupled to an I/O interface 104, a last level cache (LLC) 106, and a memory interface 108 via an interconnect 110. The CPU includes one or more processor cores and each processor core may have a respective connection to the interconnect 110 and operate independently from the other processor cores. In some embodiments, all or a portion of the foregoing components may be integrated on a system-on-chip (SOC) 112. The memory interface 108 is configured to facilitate access to a system memory 114. The system memory 114 is separate from the SOC 112. The CPU 102 includes one or more physical cores 116. The components or circuitry shown in FIG. 1 is for illustrative purposes and the platform 100 may include other circuitry that is not shown here in FIG. 1.

In some embodiments, the platform 100 is a part of a QoS-enabled router, switch, or I/O processor. The platform 100 may also be implemented by a QoS-enabled router, switch, or I/O processor. Such a QoS-enabled router, switch, or I/O processor may be used for routing data packets in a network or interconnect fabric.

The interconnect 110 is shown here as a single double-ended arrow representing a single interconnect structure for illustration. The interconnect 110, in practice, may include one or more interconnect structures within a processor or SOC, and may include a hierarchy of interconnect segments of domains employing separate protocols. Applicable bridges may be used for interfacing between the interconnect segments and domains. For example, the portion of an interconnect hierarchy to which memory and processor cores are connected may include a coherent memory domain employing a first protocol, while interconnects at a lower level in the hierarchy are used for I/O access and employ non-coherent domains. The interconnect structure may include any existing interconnect structures, including but not limited to, buses, single and multi-lane serial point-to-point, rings, and mesh interconnect structures.

The I/O interface 104 is illustrative of various I/O interfaces that may be provided by hardware, firmware, software, or a combination thereof. The I/O interface 104 may be implemented as a discrete component, for example, an I/O controller hub (ICH) or the like, or integrated circuitry of an SOC. The I/O interface 104 may be implemented as an I/O hierarchy, such as a Peripheral Component Interconnect Express (PCIe™) I/O hierarchy. The I/O interface 104 may facilitate communications between various I/O resources/devices and other platform devices or components. One or more network interface controllers (NICs) 118 are arranged to facilitate access to or from a network 120, and various other I/O devices. The I/O interface 104 may be coupled with a firmware store and/or a disk/solid state drive (SSD) controller (not shown), which may be coupled with a drive to facilitate or configure the one or more NICs 118.

During boot-up or run-time operations, various software and firmware are loaded into the system memory 114 and being executed by the cores in the CPU 102. Depending on a particular processor or SOC architecture, one of the physical cores 116 may be configured or implemented as one or more logical cores, with processes being allocated to various logical cores. For example, each physical core may be implemented as two logical cores in light of the INTEL® Hyperthreading™ architecture.

Under a system boot for the platform 100, various firmware and/or software are loaded and configured in the system memory 114, followed by a host operating system (OS) 122. The host OS 122 may have access only to the resources allocated to it.

Figure 2:
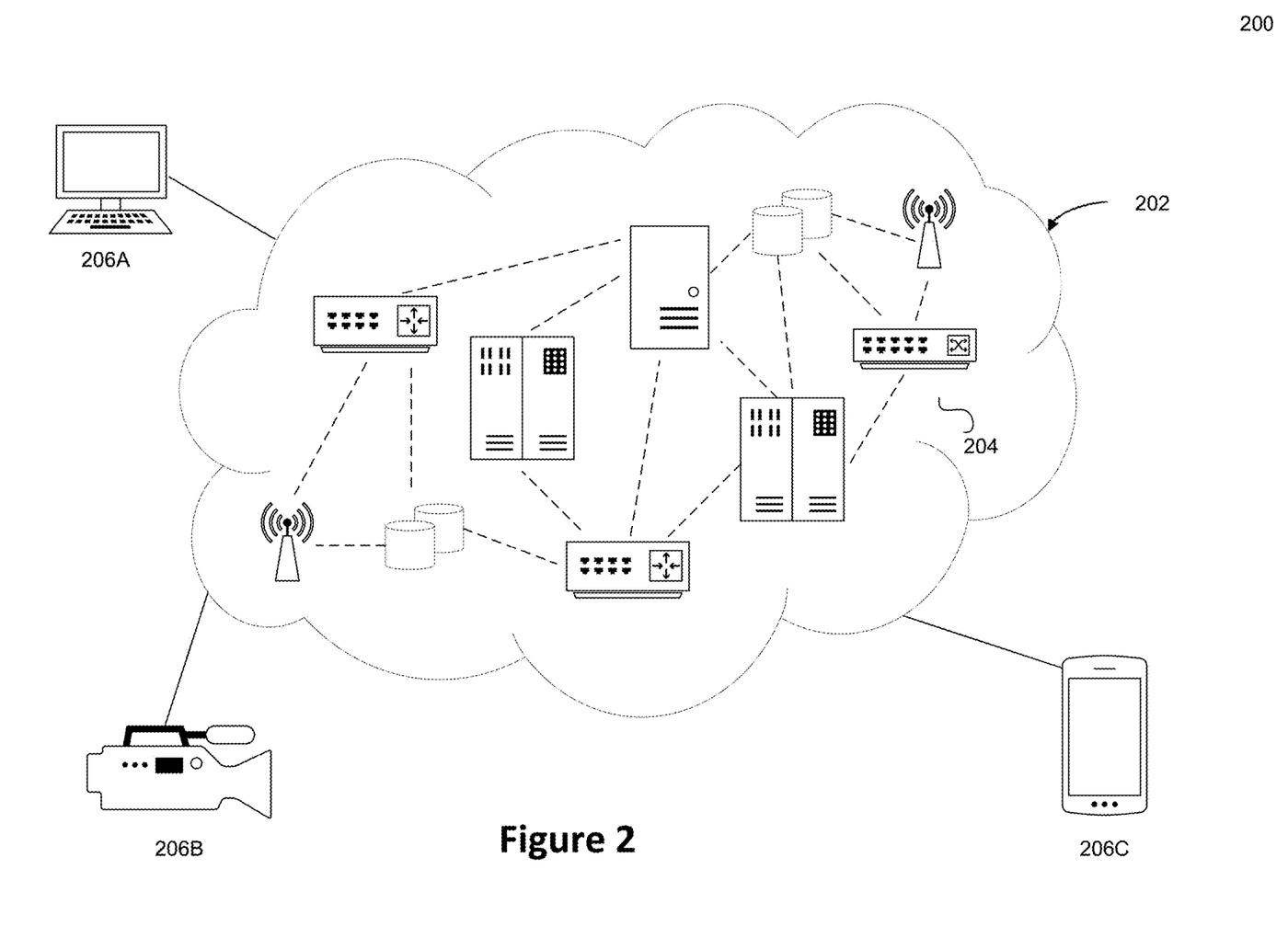
FIG. 2 depicts an example network with cloud computing, in accordance with various embodiments.

FIG. 2 depicts an example network 200. The network 200 is a cloud-computing network, an Ethernet local network, a wireless communication network, or some other networks. In a network of cloud computing as illustrated in FIG. 2, a cloud-computing environment 202 includes one or more computing nodes 204 with local computing devices. It is noted that in a wireless communication network, such as a long term evolution (LTE) network or fifth generation (5G) network, a backhaul environment is used to manage and operate all the traffics. The local computing devices may include, but are not limited to, computers 206A, surveillance cameras 206B, smartphones 206C, and other devices with computing power. The named computing devices herein are only for illustrative purpose, and other types of devices may also be used in the network 200. One or more of the nodes 204 may communicate with one another. The one or more nodes 204 may be grouped as one or more sub-networks, such as private, community, public, hybrid clouds, or any combination thereof, either physically or virtually. The one or more nodes 204 may include, but are not limited to, various switches, routers, servers, access nodes, and the like. Further, QoS-enabled nodes may be used in the network 200 for QoS-enabled data trafficking.

In an existing QoS framework, multiple levels of QoS are available and each of them may be designated or defined with a particular network resource and/or priority for data packet flow. Various levels of QoS are requested by a particular application/user in the network or assigned by certain OS functions. However, applications or users may plainly request more-than-needed traffic resources and/or high priority that is not commensurate with the need of their particular traffic requirements, in which network resources may not be utilized efficiently and cause harmful delay to some other data flows that need high priority trafficking.

Thus, a content-based networking provides data packet classifications with content attributes, beyond mere high/low QoS requirements, to enable more efficient network trafficking based on a more detailed service level agreement (SLA) that includes various attributes derived from underlying content-based characteristics. Information-centric networking (ICN) is an approach to evolve the internet infrastructure away from a host-centric paradigm based on perpetual connectivity and the end-to-end principle, to a network architecture focusing on content or data. Content attributes in an ICN include, but are not limited to, data flow bandwidth, latency, reliability, and jitter requirements. With respect to a data packet, a designated AV, in embodiments, includes all or some of the attributes in at least one tuple to depict the requested priorities corresponding to the content attributes, based on characteristics of the content. For example, a relatively large bandwidth is needed for high-definition (HD) video downloading and playback, while reliability and latency requirements are relaxed due to the nature of user experience regarding HD video online watching. An AV is then generated with high priority for bandwidth and low priorities for reliability and latency. Thus, the network can assign commensurate trafficking resource for the data flow. The relaxed reliability and latency requirements may release network resources for other data trafficking. In ICN, a publisher determines the content attributes and each data packet has a dedicated AV to indicate the determined attributes with their priorities.

Figure 3A:
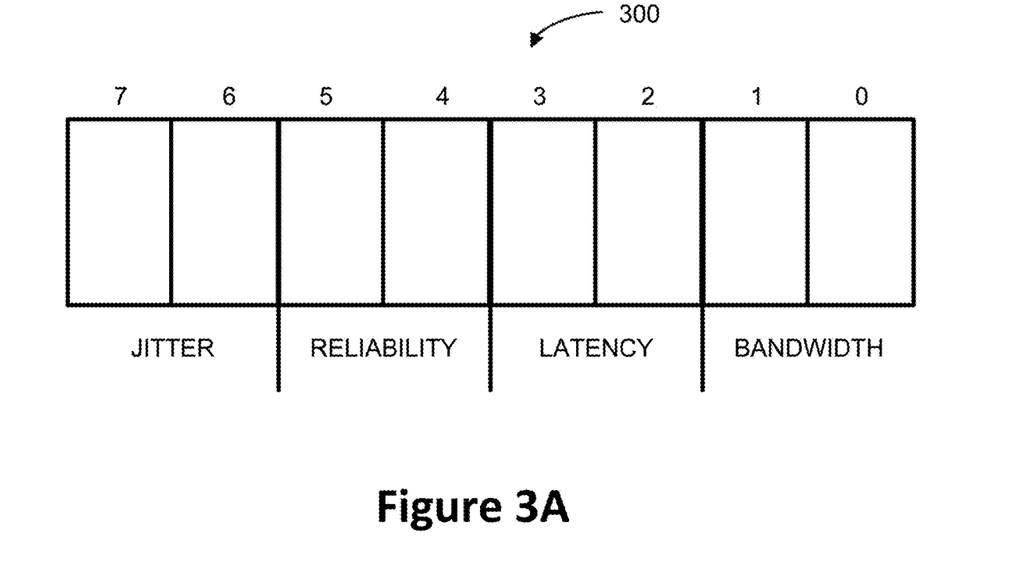
FIGS. 3A and 3B depict attribute vectors (AVs) in two example formats, in accordance with various embodiments.
Figure 3B:
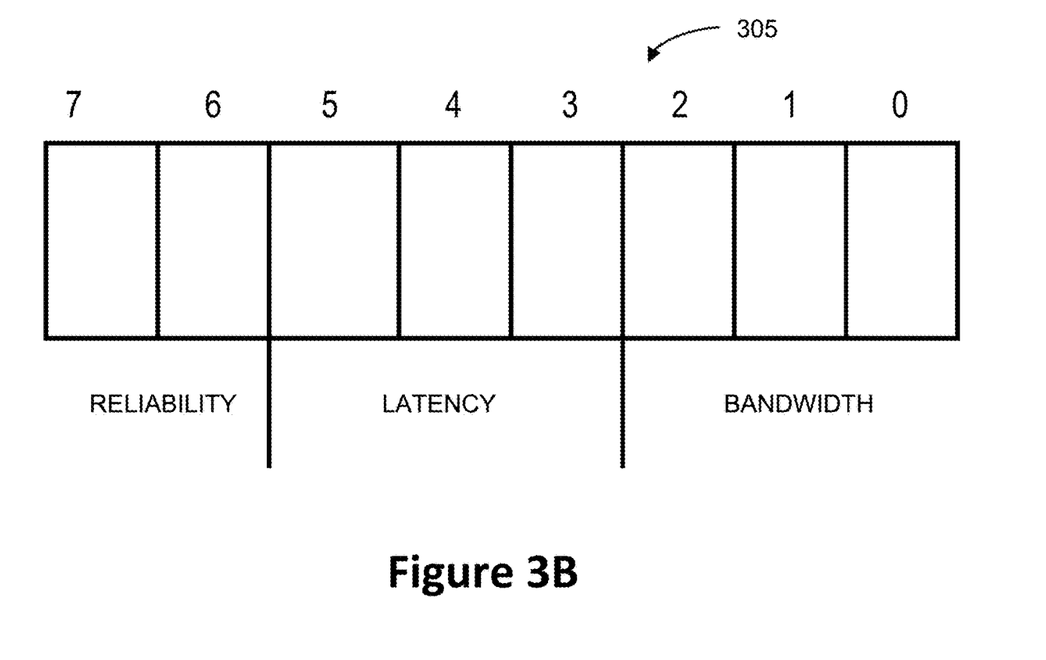

FIG. 3A illustrates an example AV 300, which contains eight bits. Each two bits indicate a priority request with respect to one content attribute. As above discussed, the content attributes include, but are not limited to, bandwidth, latency, reliability, and jitter requirement with respect to a packet in data trafficking. Bandwidth refers to a bandwidth for data packet forwarding. Latency indicates a tolerance to trafficking delay. Reliability refers to error-rate requirements regarding the packets. Jitter refers to variations in the delay of received packets. Each of the two bits indicate a priority requested by a source. The source is an application that generates or is related to the generation of the data packet or other resources in the OS. In some embodiments, the value of the AV 300 is initially determined by a publisher in an ICN. A "11" may refer to the highest priority request, and the most stringent demand, while "10," "01" and "00" may refer to a descending priority request. For example, a high priority of bandwidth requires larger bandwidth for a particular packet forwarding, and a high priority of latency indicates a smallest possible delay. In some embodiments, a "00" may indicate the highest priority request upon a system realization. FIG. 3B illustrates another example AV 305. The AV 305 has three content attributes in an 8-bit AV, which includes a 3-bit (bits 0-2) value for bandwidth, a 3-bit (bits 3-5) value for latency, and a 2-bit (bits 6-7) value for reliability. It is noted that FIGS. 3A and 3B show only two examples of the AV; other formats of an AV may be implemented with fewer or more content attributes than the ones described herein. It is noted that an AV may include at least two of the content attributes. An AV may be expressed in a tuple.

Figure 4:
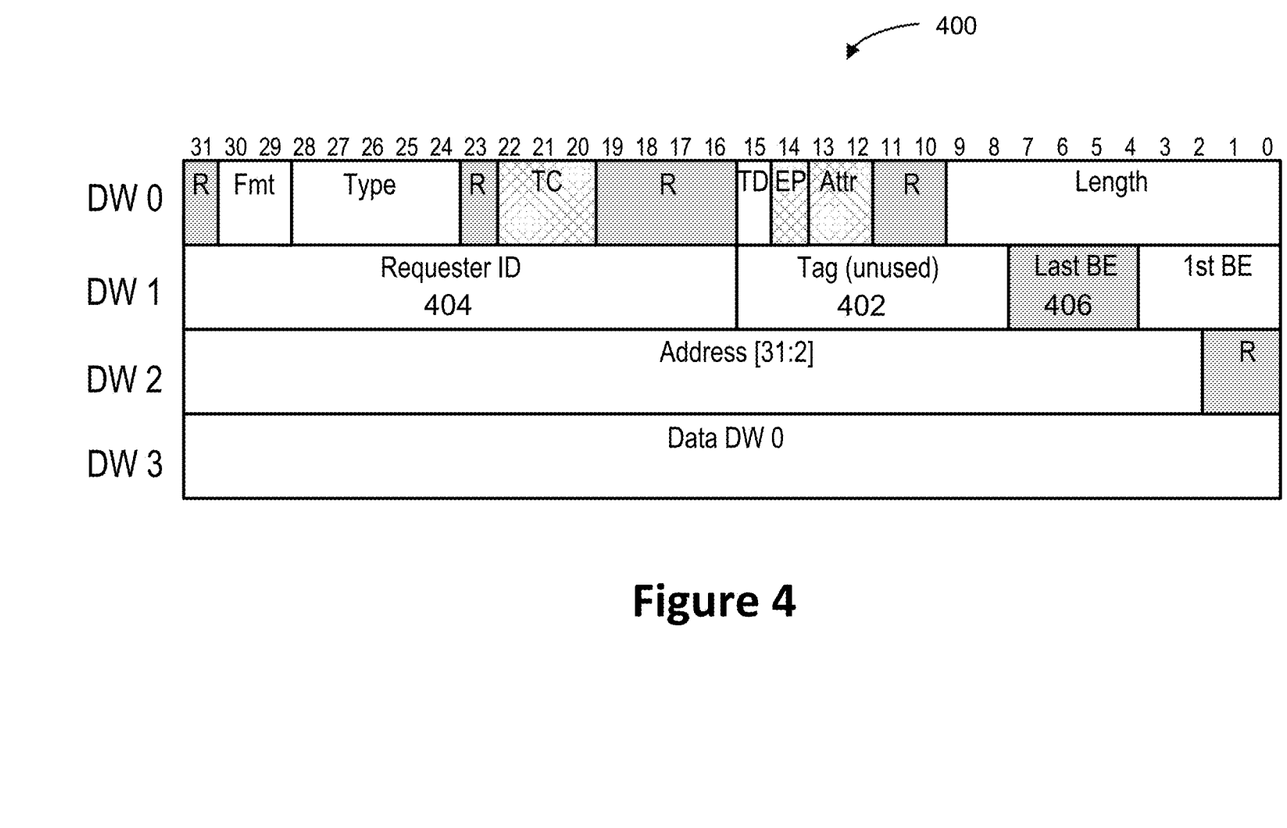
FIG. 4 illustrates an example of AV encoding with a packet header, in accordance with various embodiments.

FIG. 4 illustrates an example of encoding an AV with a packet header. Once the AV 300 is determined with corresponding priority values, for the illustrated embodiments, it is encoded with a packet header. In some embodiments, the AV 300 uses one byte (8 bits) of an optional field in the header at network layer. At an interconnect level, a 1-byte AV may be encoded using a corresponding field regarding the interconnect protocol. An example of PCIe memory write-request transport layer packet (TLP) 400 may include an unused tag field 402, among other fields. The tag field 402 may be used to encode the AV 300 for a PCIe packet. In some embodiments, the tag field 402 may be encoded in between a requester identification (ID) 404 and a last byte enable (BE) 406 in a double word (DW)-length PCIe header frame, as shown in FIG. 4. In some embodiments, one byte of the AV 300 is encoded in an extended header that is intended for customer usage in I/O scalable fabric (IOSF). Similar fields for other fabrics may be used as well. The packet may be a peripheral component interconnect (PCI), PCI express (PCIe), PCI extended (PCI-X), input/output (I/O), or I/O scalable fabric (IOSF) data packet.

Figure 5:
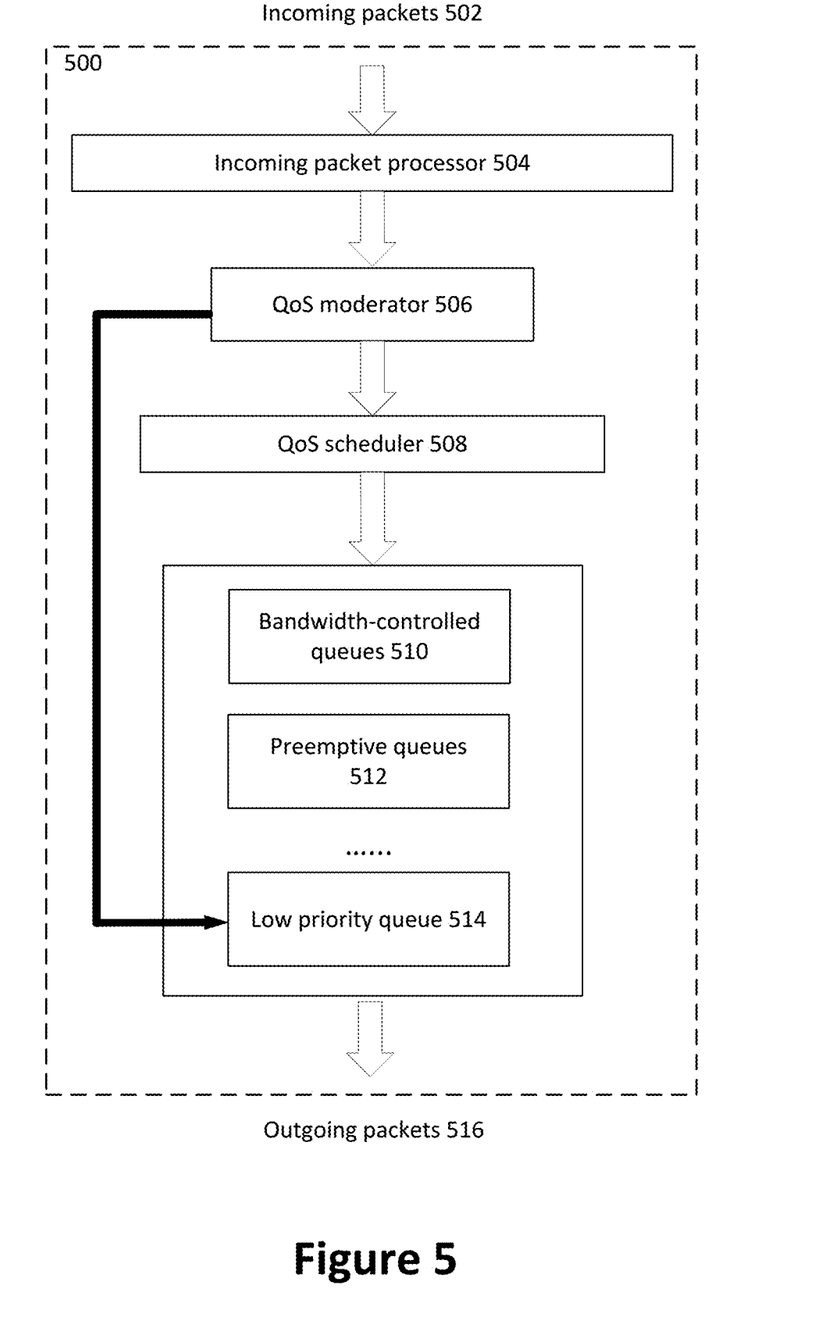
FIG. 5 illustrates an example routing device respecting data flow in a content-based QoS-enabled routing process, in accordance with various embodiments.

FIG. 5 illustrates an example routing device 500 respecting data flow in a content-based QoS-enabled routing process, in accordance with various embodiments. The routing device 500 is or a part of one or more interconnects in the platform 100 and the like to route data packets in the system. The routing device 500, for the illustrated embodiments, is a QoS-enabled switch, router, or I/O device in the network 200, cluster, cloud, or other similar networks. FIG. 5 illustrates representative components that are part of or related to the routing process. It is noted that other components or devices in the routing device 500 may not be described for the purpose of simplicity. Following determination of an AV tuple, the AV tuple is encoded in a packet header. Each packet may include a particular AV designated to the packet. A plurality of those AV encoded/embedded packets may be received as incoming packets 502 by the routing device 500. Incoming packets 502 are forwarded to the routing device 500 by one or more NICs for packet processing and routing. One or more incoming packet processors 504 include allocating the packets 502 to various access control list (ACL) entries, routing the packets 502 based on certain system parameters, extracting each AV embedded in each of the packets 502. In some embodiments, the packets 502 are stored, before or after the incoming packet processor 504, by a buffer memory for further processing.

The incoming packet processor 504 further decodes the extracted AV for validity determination of the AV 300. In some embodiments, an AV decoder is used to decode the extracted AV. Further, the AV decoder extracts the embedded AV from the packet header. In some embodiments, a QoS moderator 506 decodes the extracted AV. The QoS moderator 506 examines and determines whether the AV 300 is valid or invalid.

In some embodiments, a valid AV refers to an adequate content-based QoS request and an invalid AV refers to an inadequate request, based on certain prescribed AV guidelines. For example, if an AV requests highest priorities for all content attributes, the AV may be deemed invalid, such as an AV of "11111111" based on the AV structure in FIG. 3A. Here a "11" means a highest priority of an attribute and all of the four attributes are requested with the highest priority. Other criteria may be adopted in AV validation, either alternatively or additionally. In some embodiments of a similar AV structure as above-mentioned, while each 2-bit value indicates a particular priority and there are four attributes in the AV, a summation of the four attribute values may be used to determine the validity of the AV. For example, if the summation exceeds a threshold value, the AV may be deemed invalid. In other embodiments, while a 1-bit value (either "0" or "1") represents an attribute priority, a count of all the "1"s may be used to determine the validity of the AV. For example, if the count of the "1"s exceeds a threshold number, the AV may be deemed invalid. This approach may also be used for the above-mentioned AV structure with 2-bit value indication. However, it may not be effective if a 3-bit value is used to indicate a priority request. Nevertheless, this approach may be coupled with some other approach to determine validity of an AV. The above-mentioned approaches may enforce individual content attributes to be considered and determined dependently, because if one AV requests relatively high priorities for most of the attributes, the AV may be deemed invalid and lose them all. If an AV is not invalid, then it is a valid AV.

In some embodiments, once the AV 300 is determined to be valid, a QoS scheduler 508 determines a specific network resource and configures a trafficking theme to accommodate adequate packet trafficking. The determination identifies a specific queue with certain features or characteristics for the packet forwarding. Alternatively, such determination and/or configuration may be done by the QoS moderator 506. The QoS scheduler 508 is further arranged to place the packets into corresponding queues for various configured data forwarding. In some embodiments, the QoS moderator 506 performs all the functions of the QoS scheduler 508, and the QoS scheduler 508 is not needed. In some embodiments, upon request granting, a high priority in bandwidth request results in bandwidth-controlled queues 510 for packet forwarding. In accordance, one or more weighted Round-Robin (RR) queues is used. A weighted RR queue carries two parameters to accommodate bandwidth and latency requirements: overall weight and batch size. An overall weight may indicate an overall average bandwidth for trafficking, and a batch size may affect an average latency. For example, for a data flow requesting high bandwidth but relaxed latency, a high weight and large batch size may satisfy the request. Large batch sizes may improve the overall system performance as well.

In other embodiments, a high-priority latency request demanding tight latency or least delay may result in preemptive queues 512. A group of the preemptive queues 512 may be reserved for the traffic demanding tight latency but not large bandwidth. Packets in the preemptive queues 512 may preempt the bandwidth-controlled queues 510, which serve bandwidth-hunger but relaxed latency traffic. Meanwhile, the preemptive queues 512 may be implemented with leaky buckets to limit the bandwidth of the preemptive queues, which may prevent users from abusing tight latency queues to transmit high-bandwidth traffic. Further, one or more rates of the leaky buckets may be set to limit the transmitting bandwidth in the preemptive queues 512. In this setting, a flow may not effectively require both large bandwidth and tight latency.

In some embodiments, a high-priority to reliability requirement results in queues with certain features, such as a stronger forward error Ccorrection (FEC) mechanism, wherein a sender encodes the message in a redundant way by using an error-correcting code (ECC). The stronger FEC may be implemented as an addition to a weighted RR queue, or a preemptive queue with leaky buckets. Alternatively, a queue may be equipped with the stronger FEC solely.

In some embodiments, a high-priority to jitter requirement results in queues with fair queuing (FQ) pacing to pace packets out of a fast host. The FQ pacing may be implemented alone or in a combination with other queuing techniques. Various queues may be configured with different pace rates and/or other parameters in FQ pacing. One or more specific queues may be determined based on detailed AV information.

It is noted that other types of queues may be used for data trafficking as well. The above-mentioned queues are only illustrative. All the features of queues may be used alone, or in any combination thereof. For example, a weighted RR queue with stronger FEC may be used together for certain packet trafficking based on the corresponding AV requests.

Alternatively, once the AV 300 is determined to be invalid, the packet may be routed to a low priority queue 514, rather than going through QoS scheduler 508. There may be at least one low priority queue. The low priority queue may be configured with a lowest priority setting with respect to some or all content attributes. This queue may be further configured without stronger FEC. If a system has already been busy loaded with traffic, packets in the low priority queue 514 may suffer unfavorable transmission, regardless of the high priorities in the AV tuple. This approach may motivate AV requests to be adequate rather than blindly requesting highest priorities for all the attributes, which would lead to a more efficiently utilized network.

In some embodiments, one or more queues are part of or coupled to one or more VCs in an interconnect environment. The transmission characteristics of each VC may be determined and configured by a system configuration in a static/semi-static fashion, in which a setting for the VC may not be modified from time to time. Alternatively, the VCs may be dynamically modified or re-configured based on AV requests and/or the network traffic condition.

Packets in the various queues or VCs are then being forwarded out as outgoing packets 516. The outgoing packets 516 may carry a similar format as the incoming packets 502 or be processed into a different format. For example, the incoming packets 502 may be assembled with additional header information, or into packets of different layers, according to an Open Systems Interconnection (OSI) model.

Figure 6A:
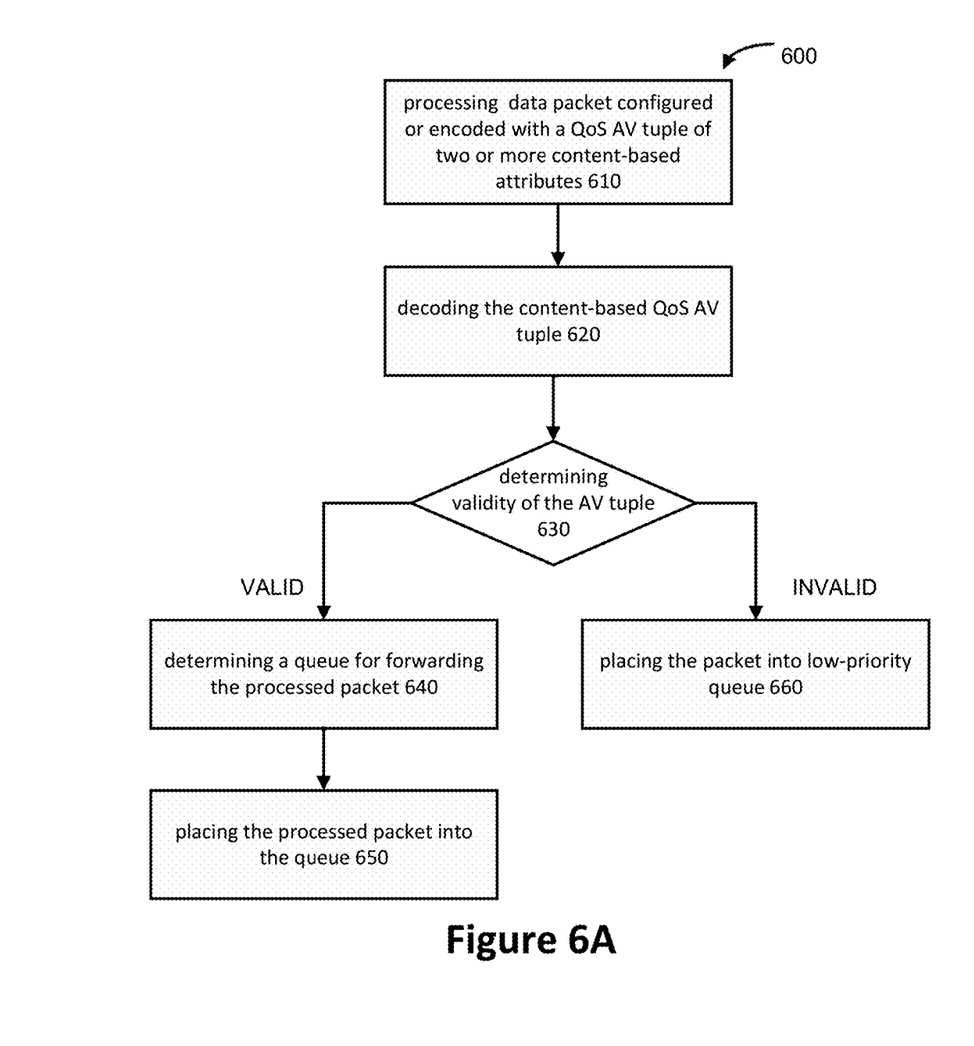
FIG. 6A illustrates an operation flow/algorithmic structure to facilitate a process of data packet routing by the routing device in accordance with some embodiments.

FIG. 6A illustrates an operation flow/algorithmic structure 600 to facilitate a process of data packet routing by the routing device 500 in accordance with some embodiments. The operation flow/algorithmic structure 600 may be performed by the routing device 500 or circuitry thereof.

The operation flow/algorithmic structure 600 includes, at 610, processing an incoming data packet configured or encoded with a QoS AV tuple of two or more content-based attributes, the each content-based QoS AV tuple specifying two or more priority rankings with respect to the two or more content-based attributes. The content-based attributes may include, but are not limited to, bandwidth, latency, reliability, and jitter requirement with respect to a packet in data trafficking. Bandwidth may refer to a bandwidth for data packet forwarding. Latency may indicate a tolerance to trafficking delay. Reliability may refer to error-rate requirements regarding the packets. Jitter may refer to variations in the delay of received packets. In some embodiments, the incoming data packets may be received by a buffer memory and stored therein for processing.

The operation flow/algorithmic structure 600 further includes, at 620, decoding the content-based QoS AV tuple. The content-based QoS AV tuple may be encoded and embedded in a packet header. Such a packet may be a PCI, PCIe, PCI-X, I/O, IOSF data packet, or other data packet. The decoded content-based QoS AV tuple may reveal respective priority rankings with respect to corresponding content-based attributes.

The operation flow/algorithmic structure 600 further includes, at 630, determining validity of the decoded content-based QoS AV tuple. A valid AV tuple refers to an adequate content-based QoS requirement and an invalid AV tuple refers to an inadequate QoS requirement, based on certain prescribed AV guidelines. For example, if an AV tuple requests highest priorities for all content attributes, the AV tuple may be deemed invalid, such as an AV of "11111111" according to the AV structure in FIG. 3A. Here a "11" means a highest priority of an attribute and all four attributes are requested with the highest priority in the AV tuple. Other criteria may be adopted in AV validation, either alternatively or additionally. In some embodiments of a similar AV structure as above-mentioned, while each 2-bit value indicates a particular priority and there are four attributes in the AV tuple, a summation of the four attribute values may be used to determine the validity of the AV. For example, if the summation exceeds a threshold value, the AV tuple may be deemed invalid. In other embodiments, while a 1-bit value (either "0" or "1") represents an attribute priority, a count of all the "1"s may be used to determine the validity of the AV tuple. For example, if the count of the "1"s exceeds a threshold number, the AV tuple may be deemed invalid. This approach may also be used for the above-mentioned AV structure with 2-bit value indication. However, it may not be effective if a 3-bit value is used to indicate a priority request. Nevertheless, this approach may be coupled with some other approach to determine validity of an AV.

The operation flow/algorithmic structure 600 further includes, at 640, determining a queue for forwarding the processed data packet, while the AV tuple is deemed valid. The determination may be based on all or some of the content-based QoS attributes of the decoded AV tuple. In some embodiments, the determination of a particular queue for packet forwarding may be based on other considerations of trafficking in the network or interconnect. Various types of queues may be configured to accommodate different trafficking requirements based on the content consideration. For example, weighted RR queues with specific bandwidth and batch size may accommodate particular bandwidth and latency requirements. Preemptive queues may facilitate tight latency requirement. The preemptive queues may be implemented with leaky buckets to limit the bandwidth of the preemptive queues so that a user or application in the system may be deterred to request both high rankings regarding bandwidth and latency. Queues with FA pacing may facilitate stringent jitter requirement. Further, stronger FEC may be used alone or in any combination with other queues to accommodate a high reliability requirement.

The operation flow/algorithmic structure 600 further includes, at 650, placing the processed packet into the determined queue. The QoS moderator 506 or the QoS scheduler 508 may place the processed packet into the determined queue. The QoS moderator 506 or the QoS scheduler 508 may further assemble the processed packet for further trafficking before placing it into the queue.

The operation flow/algorithmic structure 600 further includes, at 660, placing the processed packet into a low priority queue. The low priority queue may be a lowest priority queue without stronger FEC among all possible queues.

Figure 6B:
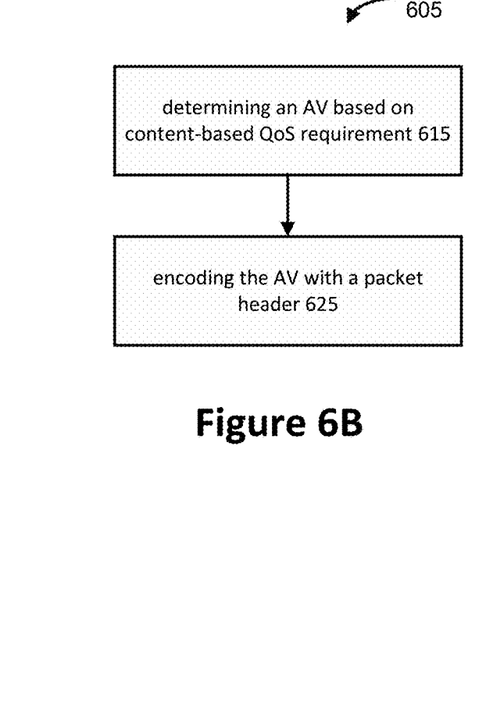
FIG. 6B illustrates an operation flow/algorithmic structure to facilitate the process of data packet routing by a user device in accordance with some embodiments.

FIG. 6B illustrates an operation flow/algorithmic structure 605 to facilitate the process of data packet routing by a user device or application in accordance with some embodiments. The operation flow/algorithmic structure 605 may be performed by one of the user devices 206A-C, illustrated in FIG. 2, or circuitry thereof.

The operation flow/algorithmic structure 605 includes, at 615, determining an AV based on content-based QoS requirement. A source may determine the AV that includes at least two content-based attributes with respect to the data packet. The source may be a user-based source, application-based source or network-based source. The determination of the AV may include determining priority ranking in each of the content-based attributes based on the content characteristics of the packets.

The operation flow/algorithmic structure 605 further includes, at 625, encoding the AV with a packet header. In some embodiments, a 1-byte of an optional field in the header may be used at network layer. At an interconnect level, a 1-byte AV may be encoded using a corresponding field regarding the interconnect protocol. An AV may use various bits to indicate content-based attributes upon various system realizations. Similar fields for other fabrics may be used as well. The packet may be a peripheral component interconnect (PCI), PCI express (PCIe), PCI extended (PCI-X), input/output (I/O), or I/O scalable fabric (IOSF) data packet.

Some non-limiting Examples of various embodiments are provided below.

Example 1 may include an apparatus comprising: a plurality of queues to queue data packets of different quality of service (QoS) attributes for forwarding; and a decoder to decode a QoS attribute vector (AV) that is encoded in a data packet and place the data packet into a determined queue of the plurality of queues for forwarding, based on the decoded QoS AV that is a tuple including a plurality of QoS priority requests with respect to a plurality of QoS attributes for data packet trafficking.

Example 2 may include the apparatus of example 1 and/or some other examples herein, wherein the plurality of QoS attributes include at least two of bandwidth, latency, reliability, and jitter.

Example 3 may include the apparatus of example 1 and/or some other examples herein, wherein the decoder is further to determine a validity of the decoded QoS AV; and determine a queue of the plurality of queues for forwarding the data packet based on the valid decoded QoS AV.

Example 4 may include the apparatus of example 3 and/or some other examples herein, wherein the determination of the queue of the plurality of queues for forwarding the data packet is to determine a weighted Round-Robin (RR) queue that is specified by an overall-weight parameter and a batch-size parameter; and determine the overall-weight parameter and the batch-size parameter to accommodate QoS attributes of bandwidth and latency.

Example 5 may include the apparatus of example 3 and/or some other examples herein, wherein the determination of the queue of the plurality of queues for forwarding the data packet is to determine a preemptive queue to accommodate high priority in QoS attribute of latency.

Example 6 may include the apparatus of example 5 and/or some other examples herein, wherein the preemptive queue is a preemptive queue with leaky buckets and the leaky buckets are associated with one or more rates to accommodate a QoS attribute of bandwidth.

Example 7 may include the apparatus of example 3 and/or some other examples herein, wherein the determination of the queue of the plurality of queues for forwarding the data packet is to determine a queue that operates with stronger forward error correction (FEC) to accommodate a high priority in QoS attribute of reliability.

Example 8 may include the apparatus of example 3 and/or some other examples herein, wherein the determination of the queue of the plurality of queues for forwarding the data packet is to determine a queue with fair queuing (FQ) pacing to accommodate a high priority ranking in QoS attribute of jitter.

Example 9 may include the apparatus of example 1 and/or some other examples herein, wherein the QoS AV is encoded in a header of the data packet by a plurality of bits, further wherein the header is of a network layer packet, a transport layer packet, or a data packet being routed over an interconnect.

Example 10 may include the apparatus of example 9 and/or some other examples herein, wherein the data packet is a peripheral component interconnect (PCI), PCI express (PCIe), PCI extended (PCI-X), input/output (IO), or scalable fabric (IOSF) data packet.

Example 11 may include the apparatus of example 1 and/or some other examples herein, wherein the decoder is further to determine that the decoded QoS AV is invalid and to place the data packet into a lowest-priority Round-Robin (RR) queue without a stronger forward error correction (FEC).

Example 12 may include the apparatus of example 11 and/or some other examples herein, wherein the decoded QoS AV is determined to be invalid such that each of the plurality of QoS priority requests indicates a highest priority request.

Example 13 may include the apparatus of example 11 and/or some other examples herein, wherein the decoded QoS AV is determined to be invalid such that a summation of the decoded QoS AV tuple exceeds a threshold value, further where the summation of the decoded QoS AV tuple is to add each value of the plurality of QoS priority requests.

Example 14 may include the apparatus of example 1 and/or some other examples herein, wherein the apparatus is a QoS-enabled switch, QoS-enabled router, QoS-enabled network interface controller (NIC), or QoS-enabled input/output (IO) processor having the plurality of queues and the decoder.

Example 15 may include the apparatus of example 1 and/or some other examples herein, wherein the plurality of queues are part of or coupled to a plurality of VCs in an interconnect environment.

Example 16 may include the apparatus of example 15 and/or some other examples herein, wherein the decoder is further to validate a plurality of AVs individually to determine individual AVs to be subject to QoS scheduling; determine, based on the validation of at least one of the plurality of the AVs for QoS scheduling, a VC for data forwarding of at least one corresponding processed packet; and schedule the at least one corresponding processed packet into a queue corresponding to the VC.

Example 17 may include the apparatus of example 16 and/or some other examples herein, wherein the decoder is to determine at least one AV of the plurality of the AVs to be invalid for QoS scheduling and to place at least one corresponding incoming data packet into a lowest-priority Round-Robin (RR) queue without a stronger forward error correction (FEC).

Example 18 may include the apparatus of example 1 and/or some other examples herein, further comprising one or more input/output (I/O) buffers to buffer a plurality of incoming data packets.

Example 19 may include the apparatus of example 1 and/or some other examples herein, further comprising a moderator to process a plurality of incoming data packets that are respectively configured with a plurality of AVs to indicate one or more content-based QoS attributes with respect to priority ranking for data forwarding; and validate the plurality of AVs individually to be valid for content-based QoS scheduling, each AV including one or more QoS attribute tuples.

Example 20 may include the apparatus of example 1 and/or some other examples herein, further comprising a scheduler to determine, based on successful validation of at least one of a plurality of the AVs, a queue for data forwarding of at least one corresponding data packet associated with the at least one valid AV, according to one or more QoS attribute tuples of the at least one valid AV; and schedule the at least one corresponding data packet into the queue.

Example 21 may include a method comprising: processing or causing to process an incoming data packet configured with a content-based quality of service (QoS) attribute vector (AV) tuple of two or more content-based attributes, the content-based QoS AV tuple specifying two or more priority rankings with respect to the two or more content-based attributes; decoding or causing to decode the content-based QoS AV tuple with respect to the two or more content-based QoS attributes; determining or causing to determine a queue for forwarding the processed data packet, based on the decoded content-based QoS AV tuple; and placing or causing to place the processed data packet into the queue.

Example 22 may include the method of example 21 and/or some other examples herein, wherein the content-based attributes include bandwidth, latency, reliability, and jitter.

Example 23 may include the method of example 21 and/or some other example herein, further comprising determining or causing to determine a validity of the decoded QoS AV tuple.

Example 24 may include the method of example 23 and/or some other examples herein, wherein the determination of the queue for forwarding the processed data packet is to determine a weighted Round-Robin (RR) queue that is specified by an overall-weight parameter and a batch-size parameter; and determine the overall-weight parameter and the batch-size parameter to accommodate QoS attributes of bandwidth and latency.

Example 25 may include the method of example 23 and/or some other examples herein, wherein the determination of the queue for forwarding the processed data packet is to determine a preemptive queue to accommodate high priority in QoS attribute of latency.

Example 26 may include the method of example 25 and/or some other examples herein, wherein the preemptive queue is a preemptive queue with leaky buckets and the leaky buckets are associated with one or more rates to accommodate a QoS attribute of bandwidth.

Example 27 may include the method of example 23 and/or some other examples herein, wherein the determination of the queue for forwarding the processed data packet is to determine a queue that operates with stronger forward error correction (FEC) to accommodate a high priority in QoS attribute of reliability.

Example 28 may include the method of example 23 and/or some other examples herein, wherein the determination of the queue for forwarding the processed data packet is to determine a queue with fair queuing (FQ) pacing to accommodate a high priority ranking in QoS attribute of jitter.

Example 29 may include the method of example 21 and/or some other examples herein, wherein the content-based QoS AV tuple is encoded in a header of the data packet by a plurality of bits, further wherein the header is of a network layer packet, a transport layer packet, or a data packet being routed over an interconnect.

Example 30 may include the method of example 29 and/or some other examples herein, wherein the data packet is a peripheral component interconnect (PCI), PCI express (PCIe), PCI extended (PCI-X), input/output (IO), or IO scalable fabric (IOSF) data packet.

Example 31 may include the method of example 21 and/or some other examples herein, further comprising determining or causing to determine that the decoded QoS AV tuple is invalid and to place the data packet into a lowest-priority Round-Robin (RR) queue without a stronger forward error correction (FEC).

Example 32 may include the method of example 21 and/or some other examples herein, wherein the decoded content-based QoS AV tuple is determined to be invalid such that each of a plurality of QoS priority requests indicates a highest priority request.

Example 33 may include the method of example 31 and/or some other examples herein, wherein the decoded content-based QoS AV tuple is determined to be invalid such that a summation of the decoded content-based QoS AV tuple exceeds a threshold value, further where the summation of the decoded content-based QoS AV tuple is to add each value of a plurality of QoS priority requests.

Example 34 may include the method of example 21 and/or some other examples herein, wherein the method is implemented by a QoS-enabled switch, QoS-enabled router, QoS-enabled network interface controller (NIC), or QoS-enabled input/output (IO) processor having a plurality of queues and a decoder.

Example 35 may include the method of example 21 and/or some other examples herein, wherein the queue is part of or coupled to a VC in an interconnect environment.

Example 36 may include the method of example 21 and/or some other examples herein, further comprising buffering or causing to buffer the incoming data packet.

Example 37 may include an apparatus comprising means to perform one or more elements of a method described in or related to any of examples 21-36, or any other method or process described herein.

Example 38 may include one or more non-transitory computer-readable media comprising instructions to cause an electronic device, upon execution of the instructions by one or more processors of the electronic device, to perform one or more elements of a method described in or related to any of examples 21-36, or any other method or process described herein.

Example 39 may include an apparatus comprising logic, modules, and/or circuitry to perform one or more elements of a method described in or related to any of examples 21-36, or any other method or process described herein.

Example 40 may include a method, technique, or process as described in or related to any of examples 21-36, or portions or parts thereof.

Example 41 may include an apparatus comprising: one or more processors and one or more computer-readable media comprising instructions that, when executed by the one or more processors, cause the one or more processors to perform the method, techniques, or process as described in or related to any of examples 21-36, or portions thereof.

The present disclosure is described with reference to flowchart illustrations or block diagrams of methods, apparatuses (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. An apparatus for routing content data packets, comprising:
    a plurality of queues to queue received content data packets of different quality of service (QoS) attributes for forwarding; and
    a decoder to decode a QoS attribute vector (AV) that is encoded in each of the received content data packets each QoS AV specifying a combination of QoS priority requests with respect to a plurality of QoS attributes for the particular received content data packet;
    wherein each of the received content data packet is placed into a determined queue of the plurality of queues for forwarding, based on the decoded QoS AV of the particular received content data packet, in response to the decoded QoS AV of the particular received content data packet having been determined to specify a valid combination of QoS priority requests with respect to the plurality of QoS attributes.

2. The apparatus of claim 1, wherein the plurality of QoS attributes include at least two of bandwidth, latency, reliability, and jitter.

3. The apparatus of claim 1, further comprising a moderator to:
    determine whether the decoded QoS AV of a particular received content data packet specifies a valid combination of QoS priority requests with respect to the plurality of QoS attributes.

4. The apparatus of claim 3, further comprising a scheduler to determine which queue of the plurality of queues a contact data packet with a QoS AV specifying a valid combination of QoS requests with respect to the plurality of QoS attributes, wherein to determine comprises to:
    determine a weighted Round-Robin (RR) queue for the particular received content data packet that is specified by an overall-weight parameter and a batch-size parameter; and
    determine the overall-weight parameter and the batch-size parameter to accommodate QoS attributes of bandwidth and latency in the decoded QoS AV of the particular received content data packet.

5. The apparatus of claim 4, wherein to determine further comprises to determine a preemptive queue for a particular received content data packet to accommodate a high priority request in a QoS attribute of latency in the decoded QoS AV of the particular received content data packet.

6. The apparatus of claim 5, wherein the preemptive queue is a preemptive queue with leaky buckets and the leaky buckets are associated with one or more rates to accommodate a QoS attribute of bandwidth in the decoded QoS AV of the particular received content data packet.

7. The apparatus of claim 4, wherein the scheduler is further to place a received content data packet into a lowest-priority Round-Robin (RR) queue without a forward error correction (FEC) mechanism, using error-correcting codes, in response to a determination by the moderator that the decoded QoS AV of the particular received content data packet specifies an invalid combination of QoS requests for the plurality of QoS attributes.

8. The apparatus of claim 7, wherein the moderator is to determine a decoded QoS AV of a particular received content data packet to be invalid when the particular decoded QoS AV specifies for each of the plurality of QoS attributes a highest priority request.

9. The apparatus of claim 7, wherein the moderator is to determine a decoded QoS AV of a particular received content data packet to be invalid when a summation of the QoS requests for the plurality of QoS attributes for the particular decoded QoS AV exceeds a threshold value; wherein the summation of the QoS requests for the plurality of QoS attributes for the particular decoded QoS AV is obtained by adding each value of the plurality of QoS requests for the plurality of QoS attributes.

10. The apparatus of claim 3, wherein to determine further comprises to determine a queue that operates with a forward error correction (FEC) mechanism that includes employment of error-correcting codes, to accommodate a high priority in QoS attribute of reliability in the decoded QoS AV of the particular received content data packet.

11. The apparatus of claim 3, wherein to determine comprises to determine a queue with fair queuing (FQ) pacing to accommodate a high priority ranking in QoS attribute of jitter in the decoded QoS AV of the particular received content data packet.

12. The apparatus of claim 11, wherein the received content data packet is a peripheral component interconnect (PCI), PCI express (PCIe), PCI extended (PCI-X), input/output (IO), or IO scalable fabric (IOSF) data packet.

13. The apparatus of claim 1, wherein the QoS AV of each received content data packet is encoded in a header of the particular received content data packet by a plurality of bits, and wherein each received content data packet is a network layer packet, or a transport layer packet being routed over an interconnect.

14. The apparatus of claim 1, wherein the apparatus is a QoS-enabled switch, a QoS-enabled router, a QoS-enabled network interface controller (NIC), or a QoS-enabled input/output (TO) processor having the plurality of queues and the decoder.

15. A method for routing content data packets, comprising:
processing or causing to process an incoming content data packet configured with a content-based quality of service (QoS) attribute vector (AV) having two or more content-based QoS requests corresponding to two or more QoS attributes, the two or more content-based QoS requests correspondingly specifying two or more priority rankings with respect to the two or more QoS attributes;
decoding or causing to decode the content-based QoS AV with respect to the two or more content-based QoS requests for the two or more QoS attributes;
determining or causing to determine whether the QoS AV specifies a valid combination of QoS requests for the QoS attributes;
determining or causing to determine a queue for forwarding the processed content data packet, based on the decoded content-based QoS AV, in response to a determination that the QoS AV specifies a valid combination of QoS requests for the QoS attributes; and
placing or causing to place the processed content data packet into the determined queue.

16. The method of claim 15, wherein the two or more QoS attributes include at least two of bandwidth, latency, reliability, and jitter.

17. The method of claim 15, wherein the determined queue is either a weighted Round-Robin (RR) queue or a preemptive queue with leaky buckets.

18. The method of claim 17, wherein the determined queue operates with a forward error correction (FEC) mechanism that includes employment of error-correcting code.

19. The method of claim 15, wherein the content-based QoS AV is encoded in a header of the content data packet by a plurality of bits, and wherein the content data packet is of a network layer packet, or a transport layer packet routed over an interconnect.

20. An apparatus for content data forwarding in interconnect fabrics, comprising:
a plurality of queues to queue content data packets of different content-based quality of service (QoS) requests for different QoS attributes to different virtual channels (VCs) for forwarding;
a decoder to process a plurality of incoming content data packets that are respectively configured with a plurality of attribute vectors (AVs) to indicate two or more content-based QoS requests for two or more QoS attributes with respect to data forwarding based on content;
a moderator to determine respective ones of the plurality of AVs as specifying valid combinations of QoS requests for a plurality of QoS attributes;
a scheduler to determine, based on the respective AVs of the plurality of incoming content data packets having valid or invalid combinations of QoS requests for the QoS attributes, the VCs for forwarding, and to schedule the processed content data packet into respective queues corresponding to the VCs.

21. The apparatus of claim 20, wherein the scheduler is further to place an incoming content data packet into a lowest-priority Round-Robin (RR) queue without a forward error correction (FEC) mechanism that employs error-correcting codes, in response to the AV of the particular incoming content data packet having been determined as specifying an invalid combination of QoS requests for the plurality of QoS attributes.

22. The apparatus of claim 20, further comprising one or more input/output (I/O) buffers to buffer the plurality of incoming content data packets.

23. An apparatus for content data forwarding in a quality of service (QoS) enabled network, comprising:
hardware processor and memory coupled to each other;

a plurality of queues stored in the memory to queue received content data packets of different content-based QoS requests for a plurality of QoS attributes for forwarding;

a moderator stored in the memory to be executed by the hardware processor to:
  process the received content data packets that are respectively configured with a plurality of attribute vectors (AVs) to indicate two or more content-based QoS requests for the plurality of QoS attributes; and
  determine whether the plurality of AVs respectively specify valid combinations of QoS requests for the QoS attributes; and a scheduler stored in the memory to be executed by the hardware processor to:
  determine, based on whether the AVs of the received content data packets have specified valid or invalid combinations of QoS requests for the QoS attributes, queues for forwarding the received content data packet; and
  schedule the received content data packets into the determined queues.

24. The apparatus of claim 23, wherein the scheduler is to place a received content data packet into a lowest-priority Round-Robin (RR) queue without a forward error correction (FEC) mechanism that employs error-correcting codes, in response to the AV of the particular received content data packet having been determined to specify an invalid combination of QoS requests for the QoS attributes.

25. One or more non-transitory computer-readable media (NTCRM) comprising instructions to, upon execution of the instructions by a routing apparatus or a portion thereof, cause the routing apparatus to:
  process received content data packet with a packet header having
    a requester identification (ID),
    followed by a quality of service (QoS) attribute vector (AV), and
    followed by a last byte enable (BE);
  wherein the QoS AV specifies at least two content-based priority rankings of respective QoS attributes; and
  wherein queuing for forwarding of the received content data packet is based at least in part on whether the QoS AV specifies a valid or invalid combination of priority rankings of the QoS attributes.

26. The NTCRM of claim 25, wherein the received content data packet is a peripheral component interconnect express (PCIe) data packet, and wherein the routing apparatus is further caused to decode the QoS AV and to determine whether the AV specifies a valid or invalid combination of priority rankings with respect to the QoS attributes, and forward the PCIe data packet based at least in part on a result of the decoding and determining.

* * * * *